US012641504B2

(12) United States Patent (10) Patent No.: US 12,641,504 B2
Habibullah et al. (45) Date of Patent: May 26, 2026

(54) MANAGING NETWORKS TO PREVENT SIGNAL FLOODING

(71) Applicant: Cisco Technology, Inc., San Jose, CA (US)

(72) Inventors: Tariq Habibullah, Allen, TX (US); Solomon Ayyankulankara Kunjan, Apex, NC (US); Dennis Lanov, Richardson, TX (US); Guilherme Razzolini Correia, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 440 days.

(21) Appl. No.: 18/321,364

(22) Filed: May 22, 2023

(65) Prior Publication Data

US 2024/0397398 A1 Nov. 28, 2024

(51) Int. Cl.
*H04W 36/08* (2009.01)
*H04W 28/02* (2009.01)

(52) U.S. Cl.
CPC ....... *H04W 36/08* (2013.01); *H04W 28/0231* (2013.01)

(58) Field of Classification Search
CPC .......................... H04W 36/08; H04W 28/0231
See application file for complete search history.

(56) References Cited

U.S. PATENT DOCUMENTS

| | | |
|---|---|---|
| 10,467,892 B2 | 11/2019 | Jensen et al. |
| 2010/0190494 A1 | 7/2010 | Lee |
| 2017/0325144 A1 | 11/2017 | Raghunathan et al. |
| 2019/0174406 A1 | 6/2019 | Hwang et al. |
| 2022/0110186 A1 | 4/2022 | Chen |
| 2023/0422196 A1* | 12/2023 | Youtz .................... H04W 60/00 |

FOREIGN PATENT DOCUMENTS

| | | |
|---|---|---|
| WO | 2021212361 A1 | 10/2021 |
| WO | 2021237613 A1 | 12/2021 |

OTHER PUBLICATIONS

Martin-Sacristan, et al., "Signaling Reduction in 5G eV2X Communications Based on Vehicle Grouping," 2019 European Conference on Networks and Communications (EuCNC), Jun. 2019, 5 pages.

* cited by examiner

*Primary Examiner* — Justin Y Lee
(74) *Attorney, Agent, or Firm* — Edell, Shapiro & Finnan, LLC

(57) ABSTRACT

Presented herein are efficient techniques through which it may be identified that a user device has transmitted a threshold number of signaling messages associated with one or more requests in a first time period. The user device may be placed in a suppression state based on the identifying and the user device may be removed from the suppression state when no signaling messages associated with the one or more requests are received during a second time period or when a signaling message associated with a different request is received from the user device.

20 Claims, 13 Drawing Sheets

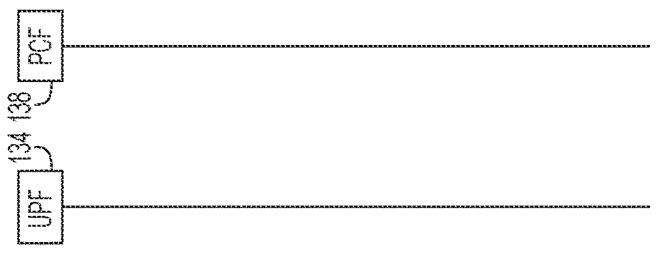
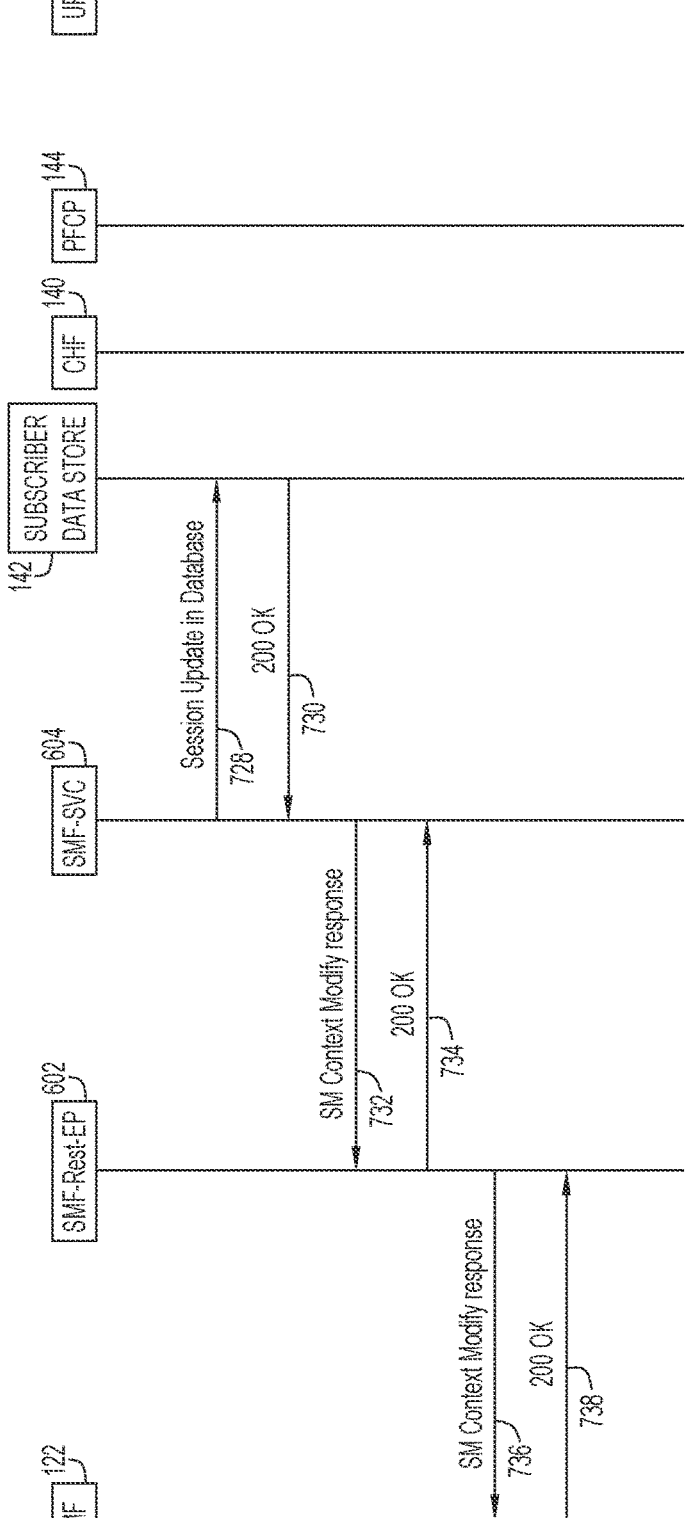
FIG.7B

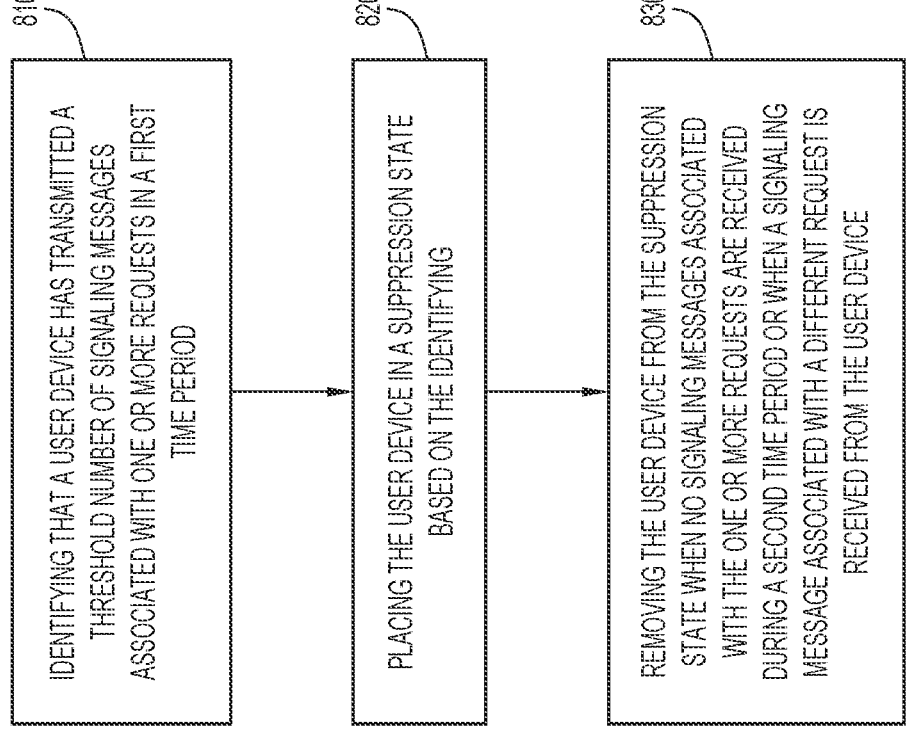

810

IDENTIFYING THAT A USER DEVICE HAS TRANSMITTED A THRESHOLD NUMBER OF SIGNALING MESSAGES ASSOCIATED WITH ONE OR MORE REQUESTS IN A FIRST TIME PERIOD

820

PLACING THE USER DEVICE IN A SUPPRESSION STATE BASED ON THE IDENTIFYING

830

REMOVING THE USER DEVICE FROM THE SUPPRESSION STATE WHEN NO SIGNALING MESSAGES ASSOCIATED WITH THE ONE OR MORE REQUESTS ARE RECEIVED DURING A SECOND TIME PERIOD OR WHEN A SIGNALING MESSAGE ASSOCIATED WITH A DIFFERENT REQUEST IS RECEIVED FROM THE USER DEVICE

MANAGING NETWORKS TO PREVENT SIGNAL FLOODING

TECHNICAL FIELD

The present disclosure relates to network equipment and services.

BACKGROUND

Networking architectures have grown increasingly complex in communication environments. In particular, mobile communication networks have grown substantially as end users become increasingly connected to mobile network environments. As the number of mobile users increases, efficient management of communication resources and of mobile users becomes more critical.

BRIEF DESCRIPTION OF THE DRAWINGS

FIGS. 7A and 7B are message sequence diagrams illustrating a method of 5G computation and signaling based on receiving a cell re-selection message from a user device when the user device is in a suppression state, according to an example embodiment.

FIG. 8 is a flow chart depicting a method according to an example embodiment.

DESCRIPTION OF EXAMPLE EMBODIMENTS

Overview

In a network, such as a Third ($3^{rd}$) Generation Partnership Project (3GPP) 4G or 5G network, repeated signaling requests may cause signaling storms and excessive computations. For example, a user equipment (UE) may commonly perform back-and-forth cell re-selection (e.g., if the UE is in a location where two or more cells converge), which may lead to back-and-forth cell re-selection flooding. In addition, the back-and-forth cell re-selection may cause excessive computation requests to be transmitted toward the 4G or 5G core network, potentially causing a signaling storm and service outage. Failure to protect the system from such flooding opens the doors for a single rogue UE to take down the network.

Currently, in 5G networks, when a cell re-selection takes place, a UE sends a message toward an access and mobility management function (AMF) via a base station to update the 5G core about the UE's latest location. The message triggers multiple transactions that require signaling towards the session management function (SMF), user plane function (UPF), policy and control function (PCF), subscriber data store, and additional functions in the 5G core for accounting, policy, session management, and additional services. For example, a 5G operator network running converged core may see a flood of Modify Bearer Request messages from a single UE that triggers a signaling storm. Other signaling messages, such as network attach requests, repeatedly received from a single UE may also cause signal flooding, excessive computation, and network degradation. Similar processing takes place in 4G networks.

According to embodiments described herein, a UE is placed in a suppression state when the UE transmits a threshold number of signaling messages during a time period. When the UE is in the suppression state, updates related to similar signaling messages are not forwarded to functions in the 4G or 5G core to avoid signal flooding from the excessive signaling messages received from the UE. In one embodiment, the UE may remain in the suppression state until a cool-off time expires. The cool-off time is a time duration where no further similar signaling messages are received from the UE. In another embodiment, the UE may be removed from the suppression state when a different signaling message is received from the UE. Techniques described herein may optimize networks, such as 5G-as-a-Service (5GaaS) networks, private 5G (p5G) networks, mobile Internet of Things (mIoT) as-a-Service (mIoTaaS) networks, and other networks to prevent signal flooding by a UE.

EXAMPLE EMBODIMENTS

Figure 1:
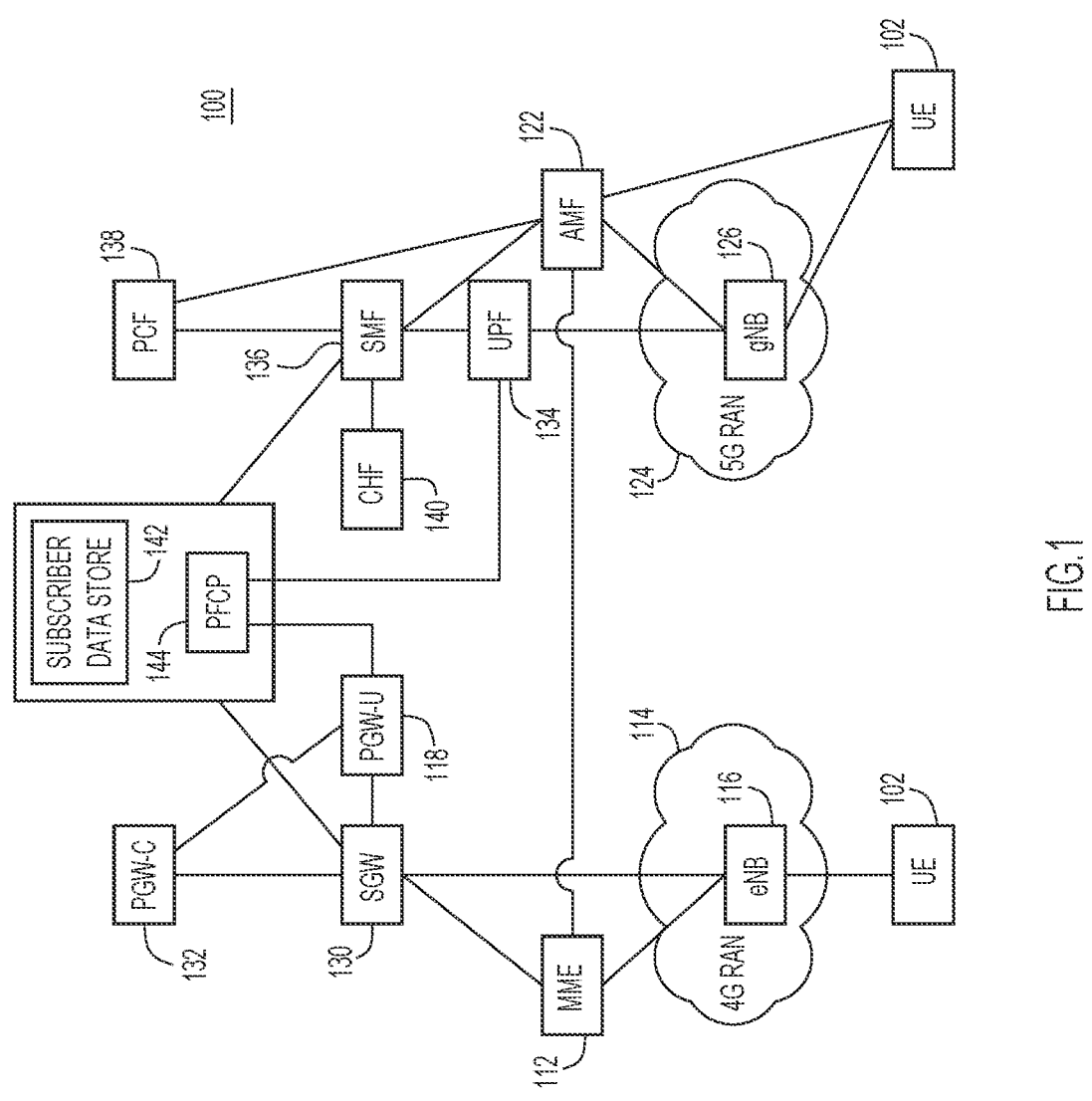
FIG. 1 is a block diagram of a system in which techniques that prevent signal flooding caused by a user device repeatedly transmitting signaling messages associated with one or more requests may be implemented, according to an example embodiment.

Referring to FIG. 1, FIG. 1 is a block diagram of a system 100 in which techniques that prevent signal flooding caused by a UE repeatedly transmitting signaling messages associated with one or more requests may be implemented, according to an example embodiment. System 100 may include a UE 102, a 4G Radio Access Network (RAN) 114, a 5G RAN 124, a mobility management entity (MME) 112, an access and mobility management function (AMF) 122, an SGW 130, a control plane packet data network gateway (PGW-U) 132, a user plane PGW (PGW-U) 118, a user plane function (UPF) 134, an SMF 136, a PCF 138, a charging function (CHF) 140, a subscriber data store 142, and a packet forwarding control protocol function (PFCP) 144.

A 4G mobile network associated with 4G RAN 114 may be referred to herein interchangeably using the terms '4G EPS', 'EPS', 'LTE', and variations thereof, such that the 4G mobile network includes the MME 112, the SGW, the PGW-U 118, and the PGW-C 132. A 5G mobile network associated with 5G RAN 124 may be referred to herein interchangeably using the terms '5GS', '5GC', and variations thereof, such that the 5G mobile network includes the AMF 122, the UPF 134, the SMF 136, the PCF 138, and the CHF 140. Functions of the 4G network and the 5G network may access the subscriber data store 142 and the PFCP 144.

4G RAN 114 may include an evolved NodeB (eNodeB or eNB) 116 that interfaces with MME 112 via an S1-MME interface and with SGW via an S1-U interface. MME 112 further interfaces with SGW 130 via an S11 interface and with AMF 122 via an N26 interface. SGW 130 further interfaces with PGW-C 132 via an S5-C interface and with PGW-U 118 via an S5-U interface.

Among other operations as discussed for various embodiments described herein, an MME, such as MME 112, generally performs operations for a 4G mobile network such as tracking area list management, idle mode UE tracking, bearer activation and deactivation, authentication services, etc. SGW 130 may process and perform operations on subscriber (e.g., UE) traffic as the traffic passes through the mobile network and facilitate end-to-end mobile network connectivity.

5G RAN 124 (also referred to as 5G New Radio (NR) access) includes a next generation NodeB (gNodeB or gNB) 126 that interfaces with AMF 122 via an N2 interface and with UPF 134 via an N3 interface. Although a 5G RAN, such as 5G RAN 124, is illustrated for systems described herein, it is to be understood that any next Generation (nG) RAN may be utilized in accordance with techniques discussed for various embodiments described herein.

Typically, an AMF, such as AMF 122, provides access authentication services, authorization services, and mobility management control functions. UPF 134 may support features and capabilities to facilitate user plane operation, such as packet routing and forwarding, interconnection to a data network, policy enforcement, and data buffering for 5G network connectivity.

AMF 122 interfaces with SMF 136 via an N11 interface and with PCF 138 via an N15 interface. SMF 136 is responsible for session management with individual functions being supported on a per session basis for 5G sessions. SMF 136 interfaces with UPF 134 via an N4 interface and with PCF 138 via an N7 interface. Typically a PCF, such as PCF 138, provides policy rules (e.g., network slicing, roaming, mobility management, etc.) for control plane functions and supports quality of service policy and charging control functions.

SMF 136 is connected to CHF 140. Typically a CHF, such as CHF 140, supports the online charging, offline charging, and convergent charging models when billing for services. SMF 136 and SGW 130 are connected to subscriber data store 142 and PFCP 144. Subscriber data store 142 can be deployed as a common data store for multiple AMF instances. A PFCP, such as PFCP 144 interfaces between the control plane and the user plane. PFCP 144 is connected to PGW-U 118.

For the 4G RAN 114, eNB 116 may include any combination of hardware (e.g., communications units, receiver(s), transmitter(s), antenna(s) and/or antenna array(s), processor(s), memory element(s), baseband processor(s) (modems), etc.)], software, logic, and/or the like that may facilitate access network connections for one or more elements of systems discussed herein, including, but not limited to, over-the-air Radio Frequency (RF) communications with UE 102. For 5G RAN 124, gNB 126 may also include any combination of hardware (e.g., communications units, receiver(s), transmitter(s), antenna(s) and/or antenna array(s), processor(s), memory element(s), baseband processor(s) (modems), etc.)], software, logic, and/or the like that may facilitate access network connections for one or more elements of systems discussed herein, including, but not limited to, over-the-air RF communications with UE 102.

In various embodiments, UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a 4G cellular communications unit, a 5G cellular communications unit, a Wi-Fi® communications unit, etc.) to facilitate over-the-air interfaces with any combination of RANs (e.g., 4G RAN 114 and 5G RAN 124).

As further described below with respect to FIG. 3, in one scenario, SGW 130 in the 4G network and SMF 136 in the 5G network may detect when a UE 102 transmits frequent signaling messages associated with one or more requests over a time period and place the UE in a suppression state based on the detection. For example, a user may be on an edge of two (or more) cells and may continuously send cell re-selection messages associated with the cells over a period of time.

According to embodiments described herein, when a threshold number of signaling messages associated with one or more requests have been received from a UE 102 in a threshold period of time, UE 102 may be placed in a suppression state. When UE 102 is in the suppression state, the subsequent signaling messages associated with the one or more requests that are received from UE 102 may be acted on, but some updates associated with the subsequent signaling messages are not forwarded to functions in the 4G or 5G cores (e.g., subscriber data store 142, PFCP 144, PGW-U 118, PGW-C 132, PCF 138, etc.).

The UE 102 may be removed from the suppression state after a cool-off time has expired. The cool-off time is a time duration where no further repetitive signaling messages associated with the one or more requests are received from the UE 102. The UE 102 may additionally be removed from the suppression state if a signaling message associated with a different request has been received. For example, if the UE 102 has been placed in a suppression state after transmitting a burst of n cell re-selection messages associated with two cells in t milliseconds, the UE 102 may be removed from the suppression state when UE 102 transmits a cell re-selection message associated with a third cell. In this example, the cell re-selection message associated with the third cell will be acted on normally (e.g., functions in the 4G/5G cores are updated with information associated with the cell re-selection request). As another example, if the UE 102 has been placed in a suppression state after transmitting n requests to attach to a network in t milliseconds, the UE 102 may be removed from the suppression state when UE 102 transmits a request to attach to a different network.

Figure 2:
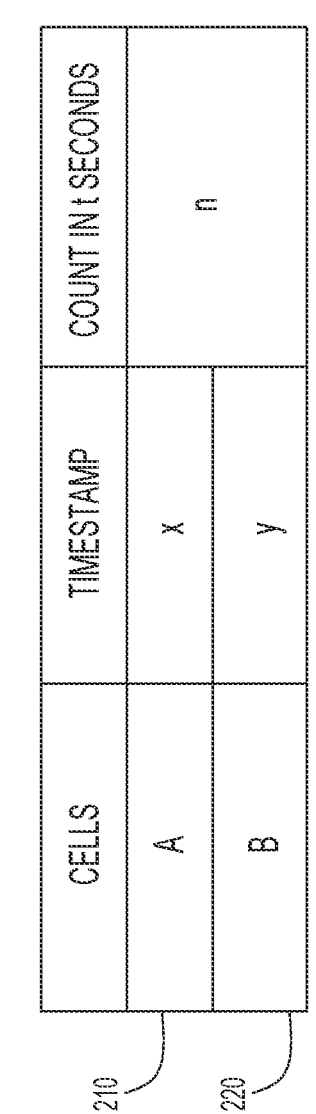
FIG. 2 is an exemplary table for tracking cell re-selection messages received from a user device, according to an example embodiment.

Reference is now made to FIG. 2. FIG. 2 is an exemplary table 200 for tracking cell re-selection messages received from a UE 102 for cells with cell identifiers A and B. Row 210 corresponds to Cell A and row 220 corresponds to Cell B. Although table 200 illustrates entries associated with two cells, table 200 may include entries with any number of cells based on the cell re-selection messages received from UE 102. Table 200 may be stored in a data structure associated with UE 102 at, for example, SGW 130, SMF 136, and/or at a different function.

Table 200 includes a "Cell" column for storing the cell identifiers for the cells associated with the base stations (e.g., an eNB 116 or gNB 126) to which UE 102 has attached, a "Timestamp" column for storing the timestamps corresponding to the time when UE 102 was last attached to the base station, and a "Count in t seconds" column for storing a number of times a cell re-selection message associated with Cell A or Cell B has been received from UE 102 in t seconds.

As shown in rows 210 and 220 of the example table 200, a UE 102 was located in Cell A at time x and was located in Cell B at time y. In addition, UE 102 transmitted n cell re-selection messages associated with Cell A or Cell B in t seconds. In this example, the cell re-selection threshold time is t seconds and the cell re-selection threshold message count is n messages. The threshold number of messages and a length of the threshold time are configurable. Although table 200 illustrates the time in seconds, in other embodiments, the cell re-selection threshold time may be t milliseconds. In this example, UE 102 has transmitted the cell re-selection threshold number of messages (n messages) in the cell re-selection threshold time (t seconds) and, therefore, UE 102 will be placed in a suppression state.

As described further below, when UE 102 is in the suppression state, cell re-selection messages associated with Cell A and Cell B will be acted on, but updates associated with the cell re-selection messages corresponding to Cell A or Cell B will not be forwarded to some functions in the 4G or 5G core. In this way, excessive signaling and potential signal flooding are avoided.

Figure 3:
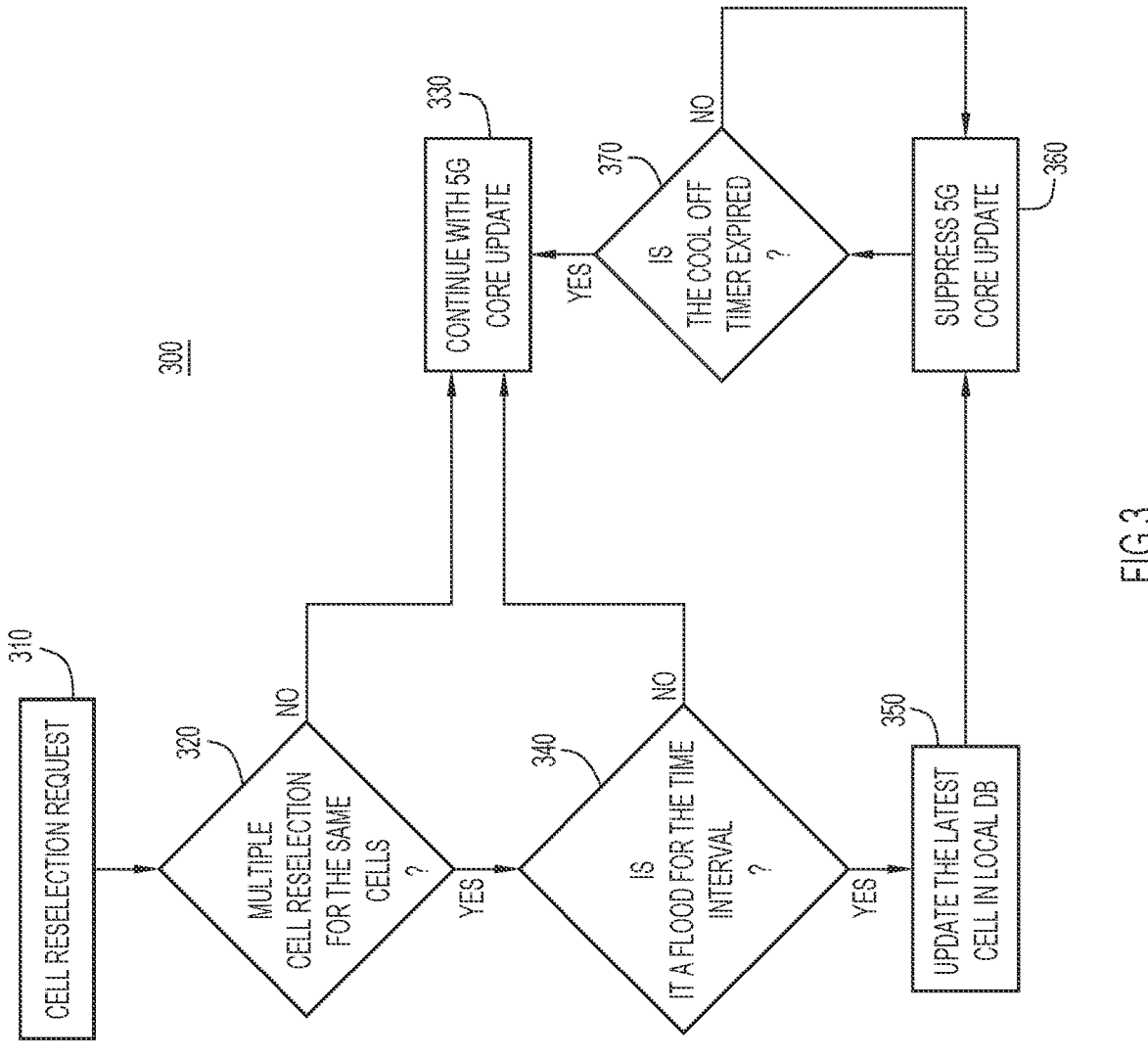
FIG. 3 is a flow chart of a method for placing a user device in a suppression state based on receiving multiple cell re-selection requests for the same cells, according to an example embodiment.

Reference is now made to FIG. 3. FIG. 3 is a flow chart of a method 300 for placing a UE 102 in a suppression state based on receiving multiple cell re-selection requests for the same cells, according to an example embodiment. Method 300 may be performed by SGW 130, SMF 136, or a different function.

At 310, UE 102 transmits a cell re-selection request. Information associated with the cell re-selection request may be stored in a table, such as table 200. At 320, it is determined whether multiple cell re-selection requests have been received from UE 102 for the same cells. If multiple cell re-selection requests have not been received for the same cells, at 330, updates associated with the cell re-selection request received at 310 are forwarded to functions in the 5G (or 4G) core.

If multiple cell re-selection requests have been received for the same cells, at 340, it is determined whether there is a flood for the time interval. For example, it is determined whether a threshold number of cell re-selection requests have been received for the same cells in a threshold time period. In one embodiment, the determination may be made using a table, such as table 200. If there is not a flood for the time interval, processing continues to 330 and updates associated with the cell re-selection request are transmitted to functions in the 5G (or 4G) core.

If there is a flood for the time interval, at 350, the current cell in which UE 102 is located is updated in the local database. For example, table 200 may be updated to indicate a timestamp with the cell requested by the cell re-selection request. At 360, the 5G (or 4G) core update is suppressed. For example, the cell re-selection request is acted upon and the UE 102 attaches to a base station associated with the cell, but updates associated with the cell re-selection are not propagated to some additional functions in the 5G (or 4G) core. For example, the messages are not forwarded to UPF 134, PCF 138, etc. Since the cell information of the last cell re-selection message is maintained in the local database, if there is a need to send downlink paging/downlink data notifications (DDNs), AMF 122/SMF 136 (or another function that stores the table 200) has the information to locate the UE 102.

At 370, it is determined whether a cool off timer has expired. For example, it is determined whether a period of time has elapsed during which no additional cell re-selection requests associated with the same cells have been received from the UE 102. A length of the cool off time is configurable. If a cool off timer has not expired, at 360, the UE 102 is maintained in the suppression state and the 5G (or 4G) core updates are suppressed. If the cool off time has expired, at 330, the UE 102 is removed from the suppression state and the 5G (or 4G) core updates are continued for subsequent requests. Although not illustrated in FIG. 3, UE 102 may additionally be removed from the suppression state if a cell re-selection request for a different cell is received from UE 102.

Figure 4A:
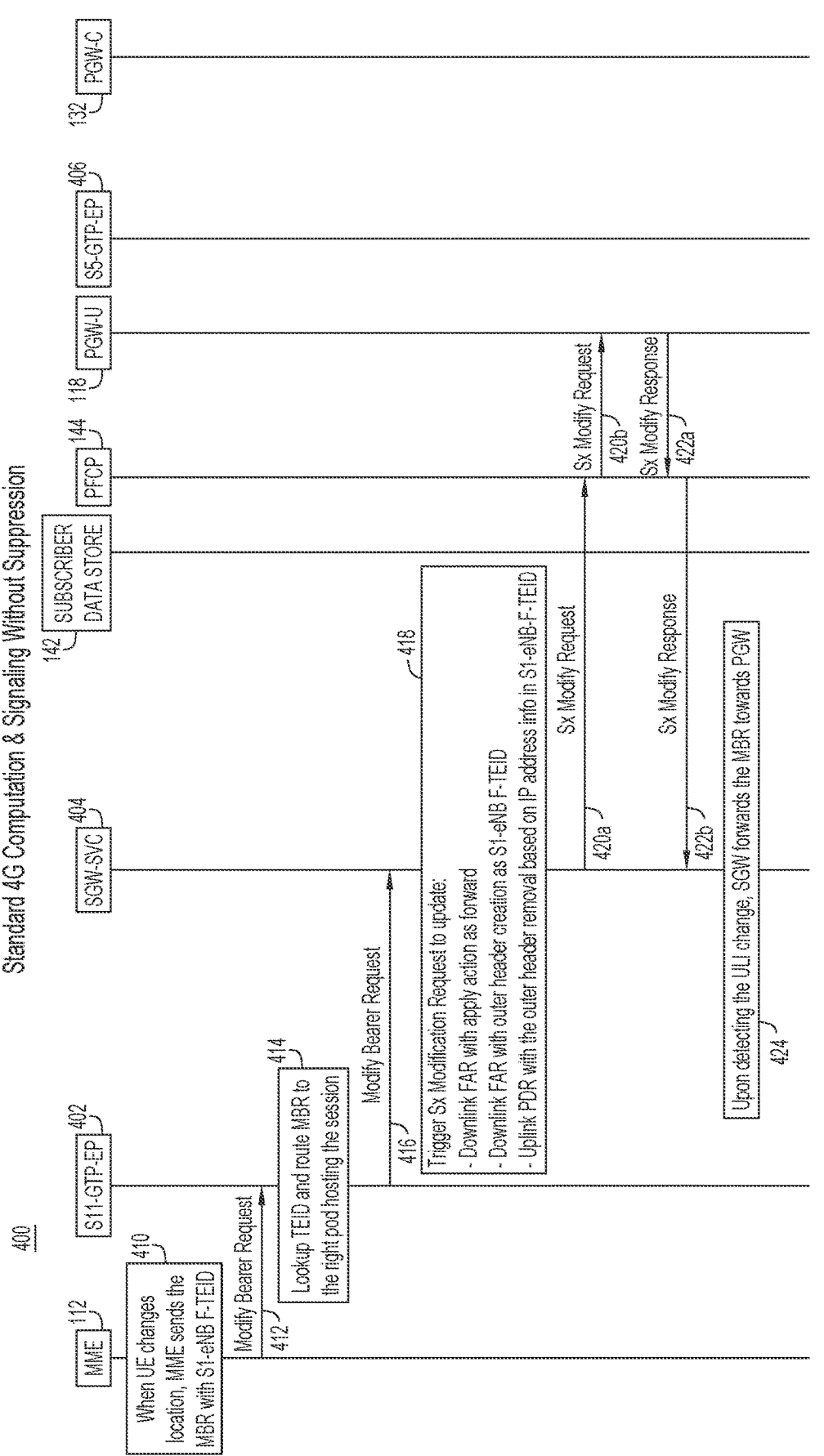
FIGS. 4A and 4B are message sequence diagrams illustrating a method for standard Fourth ($4^{th}$) Generation (4G) processing of signaling messages without user device suppression, according to an example embodiment.
Figure 4B:
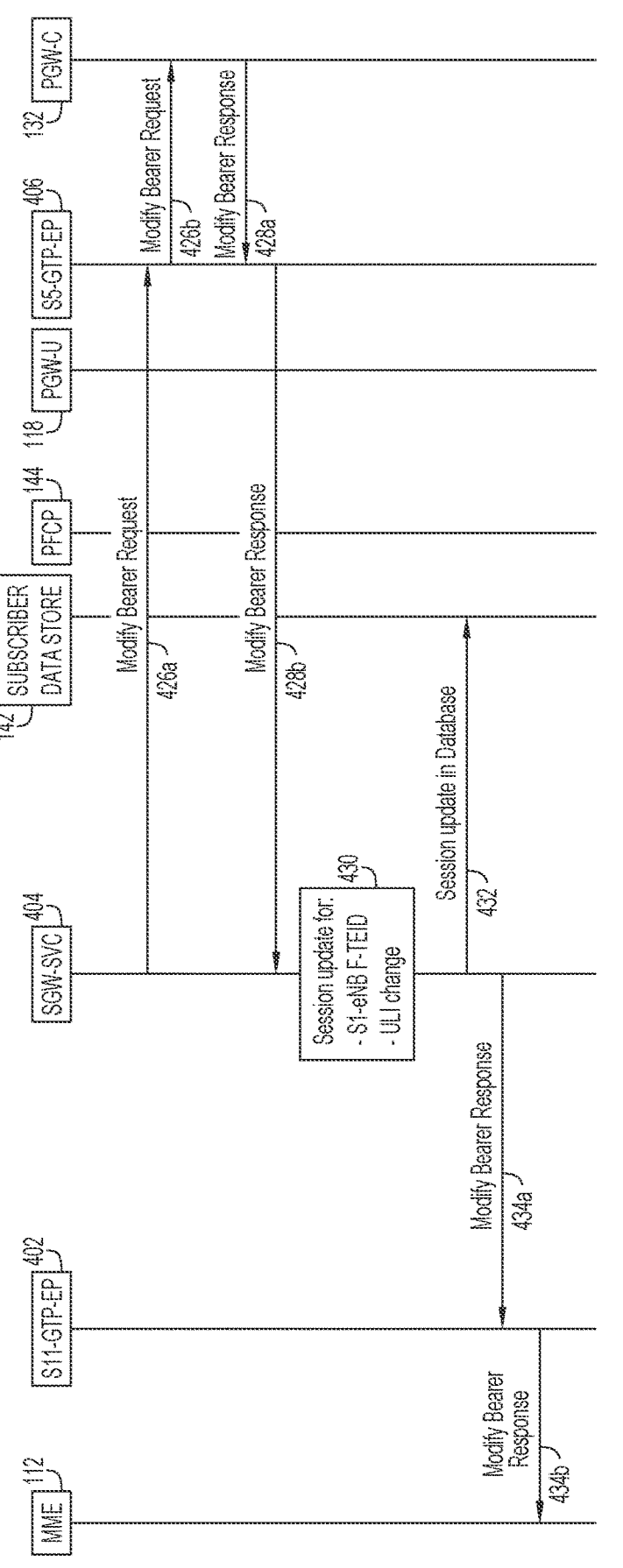

Reference is now made to FIGS. 4A and 4B. FIGS. 4A and 4B show a message sequence diagram that illustrates a method 400 for standard 4G processing of signaling messages without UE suppression. In particular, FIGS. 4A and 4B illustrate the communications when updating the 4G core that may lead to signal flooding. Method 400 is performed by MME 112, S11-General Packet Radio Service (GPRS) Tunneling Protocol (GTP)-endpoint (EP) 402, SGW-service node (SVC) 404, subscriber data store 142, PFCP 144, PGW-U 118, S5-GTP-EP 406, and PGW-C 132.

At 410, when a UE 102 changes location, MME 112 sends a Modify Bearer Request (MBR) with a S1-eNB fully qualified tunnel endpoint identifier (F-TEID) of the eNB associated with a cell re-selection message. In other words, MME 112 receives a cell re-selection message that includes an identifier of the eNB associated with the cell corresponding to the new location of UE 102. At 412, MME 112 forwards the Modify Bearer Request to the S11-GTP-EP 402 of SGW 130. At 414, S11-GTP-EP 402 performs a lookup with the TEID in the Modify Bearer Request to identify the pod (e.g., SGW-SVC 404) that is hosting the session for UE 102. At 416, S11-GTP-EP 402 forwards the Modify Bearer Request to SGW-SVC 404 of SGW 130 based on the lookup.

At 418, the Modify Bearer Request triggers an Sx Modification Request to update the downlink Forwarding Action Rule (FAR) with apply action as forward, the downlink FAR with outer header creation as S1-eNB F-TEID, and the uplink Packet Detection Rule (PDR) with the outer header removal based on the Internet Protocol (IP) address information in the S1-eNB F-TEID. At 420a, SGW-SVC 404 transmits the Sx Modify Request to PFCP 144 and at 420b, PFCP 144 forwards the Sx Modify Request to PGW-U 118. At 422a, PGW-U 118 transmits an Sx Modify Response to PFCP 144 and, at 422b, PFCP 144 forwards the Sx Modify Response to SGW-SVC 404.

At 424, SGW 130 detects the User Location Information (ULI) change, and, upon detecting the ULI change, forwards the Modify Bearer Request towards PGW-C 132. More specifically, at 426a, SGW-SVC 404 transmits the Modify Bearer Request to S5-GTP-EP 406 of PGW-C 132 and at 426b, S5-GTP-EP 406 forwards the Modify Bearer Request to PGW-C 132. At 428a, PGW-C 132 transmits a Modify Bearer Response to S5-GTP-EP 406 and, at 428b, S5-GTP-EP 406 forwards the Modify Bearer Response to SGW-SVC 404. At 430, the session is updated for the S1-eNB F-TEID and the ULI change. In particular, at 432, SGW-SVC 404 updates subscriber data store 142 by transmitting an update to the database. In addition, at 434a, SGW-SVC 404 transmits the Modify Bearer Response to S11-GTP-EP 402 and, at 434b, S11-GTP-EP 402 forwards the Modify Bearer Response to MME 112.

As illustrated in FIGS. 4A and 4B, every time a UE 102 changes location to a new cell, many different communications are transmitted to update different functions about the location of UE 102. If UE 102 is on the edge of two or more cells, UE 102 may repeatedly transmit cell re-selection messages, which leads to excessive updates and computation requests being sent to functions in the 4G core. Transmitting the excessive messages and updates to the functions in the 4G core may potentially cause a signaling storm and service outage.

Figure 5:
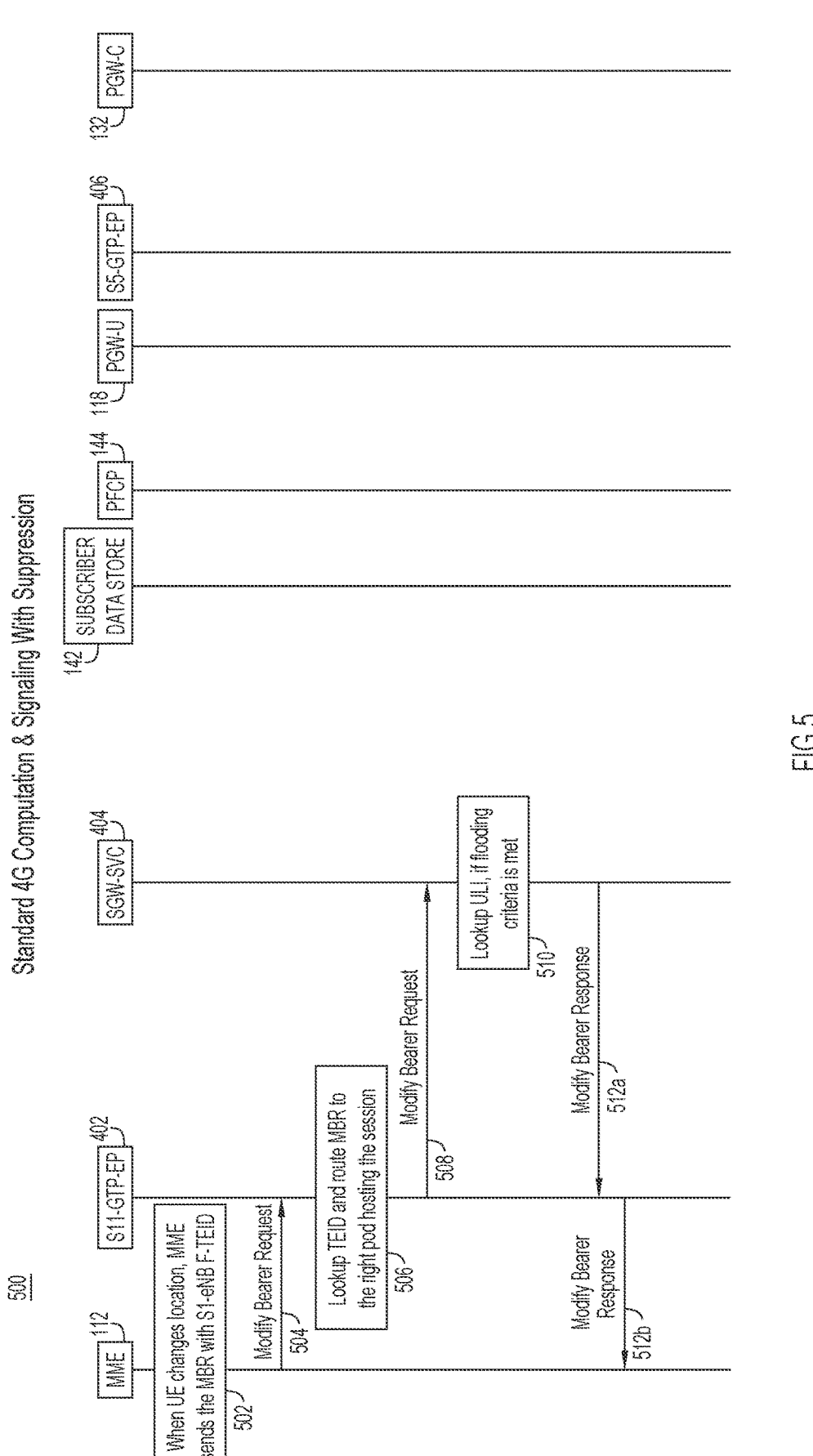
FIG. 5 is a message sequence diagram illustrating a method of 4G computation and signaling based on receiving a cell re-selection message from a user device when the user device is in a suppression state, according to an example embodiment.

Reference is now made to FIG. 5. FIG. 5 is a message sequence diagram illustrating a method 500 in which a cell re-selection request received from a UE 102 is processed by 4G functions when the UE 102 is in a suppression state. Method 500 is performed by MME 112, S11-GTP-EP 402, and SGW-SVC 404.

At 502, when UE 102 changes location, MME 112 sends a Modify Bearer Request with the S1-eNB F-TEID. In other words, MME 112 receives a cell re-selection message that includes an identifier of the eNB associated with the cell associated with the new location of UE 102. At 504, MME 112 transmits the Modify Bearer Request to S11-GTP-EP 402 of SGW 130. At 506, S11-GTP-EP 402 looks up the TEID and routes the Modify Bearer Request to the pod that is hosting the session associated with UE 102. In this case, the pod that is hosting the session is SGW-SVC 404. At 508, S11-GTP-EP transmits the Modify Bearer Request to SGW-SVC 404 based on the lookup. Steps 502-508 correspond to steps 410-416 of FIG. 4A.

At 510, SGW-SVC performs a lookup using the ULI to determine if flooding criteria is met. For example, SGW-SVC 404 may perform a lookup in a table, such as table 200, to determine whether a threshold number of cell re-selection messages have been transmitted by UE 102 for the cell associated with the eNB and one or more additional cells during a threshold period of time. In this example, UE 102 is in a suppression state (or receiving the cell re-selection message has put UE 102 in a suppression state). Because UE 102 is in the suppression state, SGW-SVC 404 does not update some of the 4G core functions (e.g., subscriber data store 142, PFCP 144, PGW-U 118, PGW-C 132, etc.) about the updated location of UE 102. Instead, at 512a, SGW-SVC 404 transmits a Modify Bearer Response to S11-GTP-EP 402 and, at 512b, S11-GTP-EP 402 forwards the Modify Bearer Response to MME 112.

By not updating some of the 4G core functions with the location information associated with UE 102, excessive signaling and signal flooding is avoided. Although not illustrated in FIG. 5, the cell information associated with the last cell re-selection message is maintained in a data store (e.g., table 200), so the MME 112 or SGW 130 is able to determine the location of UE 102.

In the example illustrated in FIG. 5, UE 102 may remain in the suppression state for a cool-off time during which no cell re-selection messages associated with the eNB and the one or more additional cells for a threshold period of time (e.g., p milliseconds, where p is configurable). Alternatively, UE 102 may exit from the suppression state if a cell re-selection message is received for a cell other than the cell associated with the eNB and the one or more additional cells. In either case, when UE 102 is no longer in the suppression state, cell re-selection messages will be acted on using standard processing, as illustrated in FIGS. 4A and 4B.

Figure 6A:
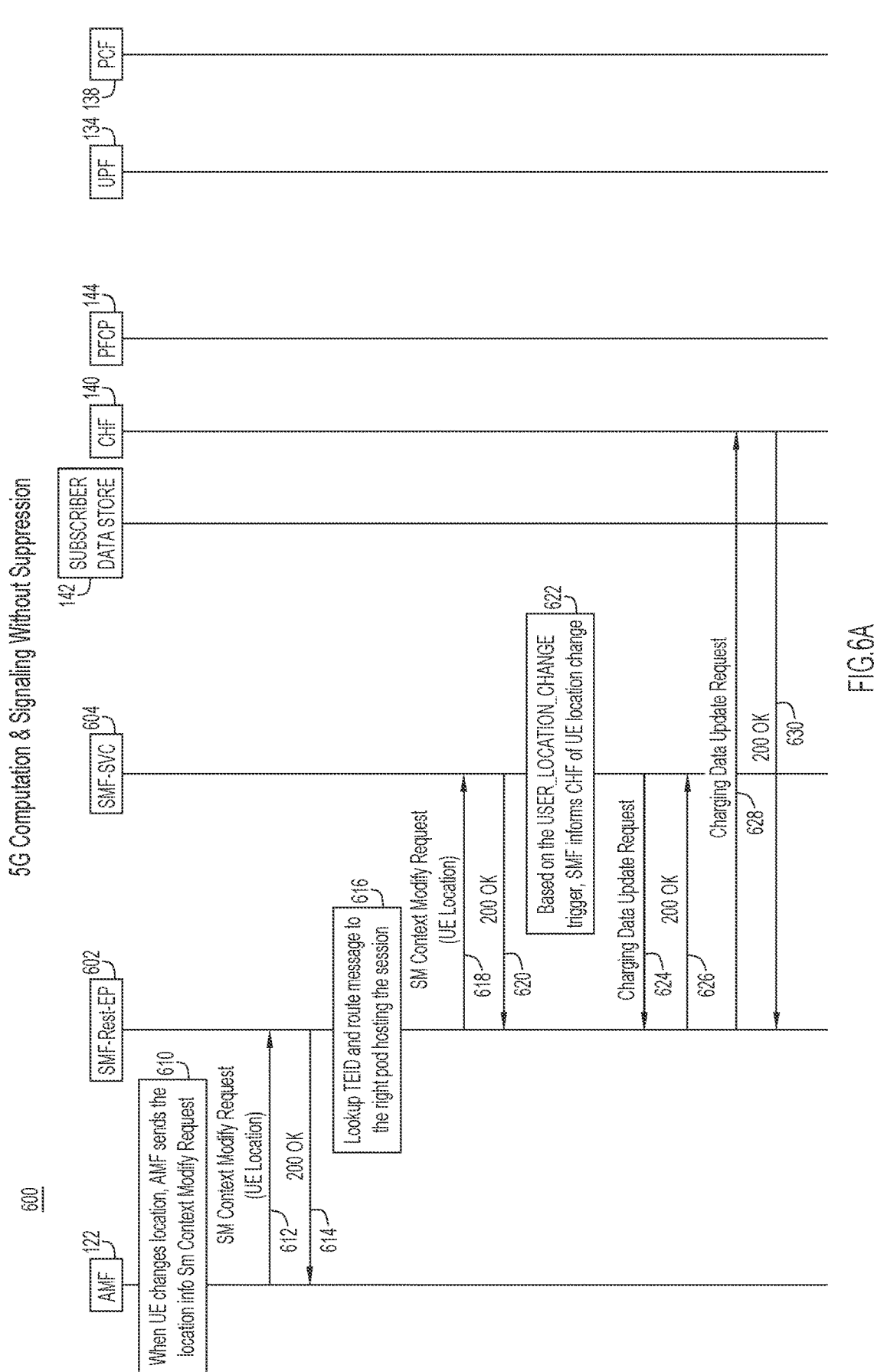
FIGS. 6A and 6B are message sequence diagrams illustrating a method for standard Fifth ($5^{th}$) Generation (5G) processing of signaling messages without user device suppression, according to an example embodiment.
Figure 6B:
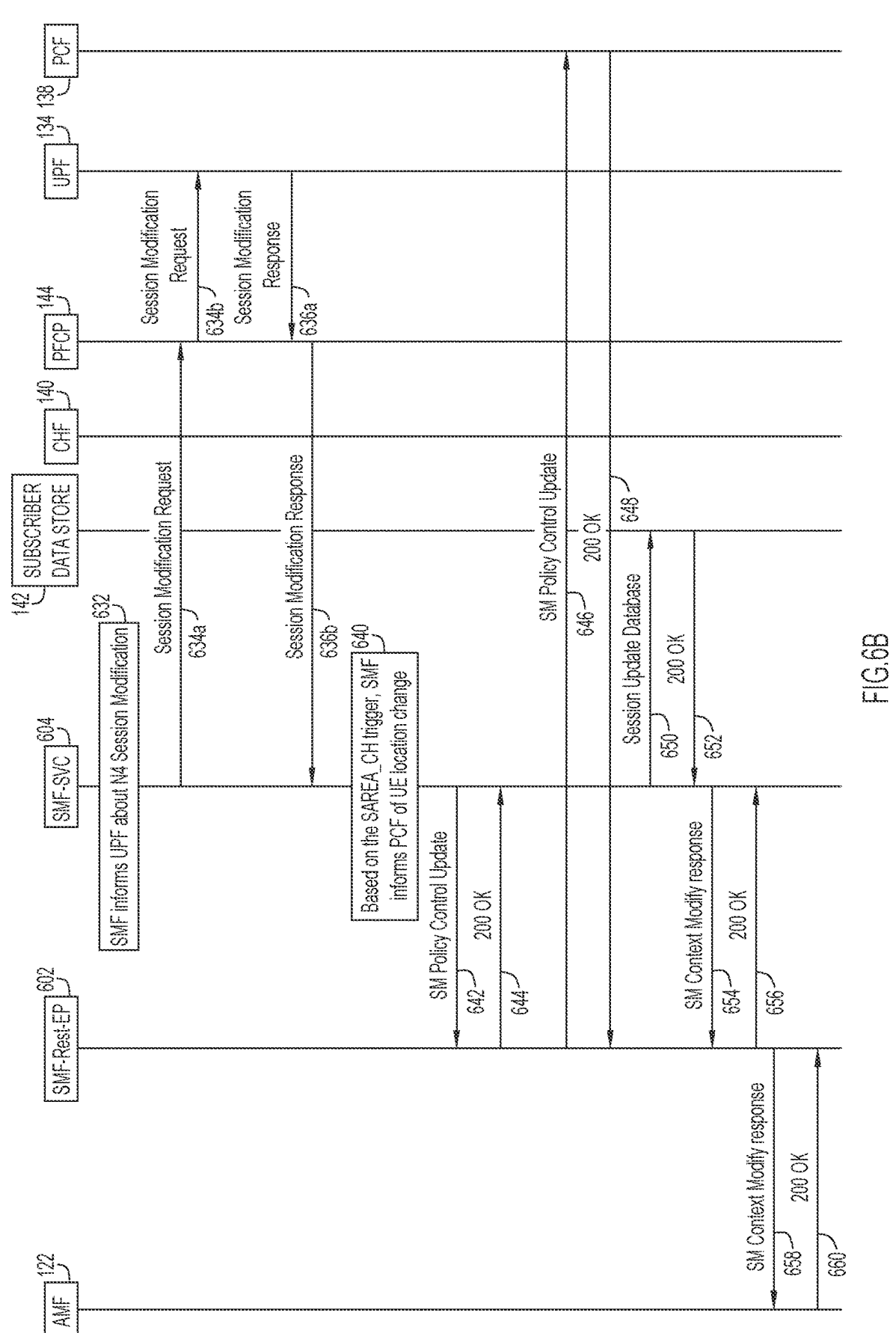

Reference is now made to FIGS. 6A and 6B. FIGS. 6A and 6B are message sequence diagrams illustrating a method 600 for standard 5G processing of signaling messages without UE suppression. In particular, FIGS. 6A and 6B illustrate the communications when updating the 5G core that may lead to signal flooding. Method 600 is performed by AMF 122, SMF-Rest-EP 602, SMF-SVC 604, subscriber data store 142, CHF 140, PFCP 144, UPF 134, and PCF 138.

At 610, when UE 102 changes location to a new cell, AMF 122 receives information associated with the new location of UE 102 and AMF 122 sends the location information in a Session Modification (SM) Context Modify Request. More specifically, at 612, AMF 122 transmits the SM Context Modify Request with the location of UE 102 to SMF-Rest-EP 602 of SMF 136. At 614, SMF-Rest-EP 602 responds with a 200 OK acknowledgment response. At 616, SMF-Rest-EP 602 performs a lookup using a TEID associated a gNB of the new cell to determine the pod hosting the session associated with UE 102. At 618, SMF-Rest-EP 602 transmits the SM Content Modify Request with the location of UE 102 to SMF-SVC 604, as determined by the lookup. At 620, SMF-SVC 604 responds with a 200 OK acknowledgment message.

As illustrated at 622, based on a USER_LOCATION_CHANGE trigger, SMF 136 informs CHF 140 of the location change associated with UE 102. To inform CHF 140 of the location change, at 624, SMF-SVC 604 first transmits a charging data update request to SMF-Rest-EP 602 and, at 626, SMF-Rest-EP 602 responds with a 200 OK acknowledgment. Based on receiving the charging data update request from SMF-SVC 604, at 628, SMF-Rest-EP transmits a charging data update request to CHF 140 and, at 630, CHF 140 sends a 200 OK message to SMF-Rest-EP.

At 632, SMF 136 informs UPF 134 about the N4 Session Modification. More specifically, at 634a, SMF-SVC 604 transmits a Session Modification Request to PFCP 144 and, at 634b, PFCP 144 forwards the Session Modification Request to UPF 134. At 636a, UPF 134 transmits a Session Modification Response to PFCP 144 and, at 636b, PFCP 144 forwards the Session Modification Response to SMF-SVC 604.

At 640, based on the SAREA_CH trigger, SMF 136 informs PCF 138 of the location change of UE 102. More specifically, at 642, SMF-SVC 604 transmits an SM Policy Control Update to SMF-Rest-EP 602 and, at 644, SMF-Rest-EP 602 responds with a 200 OK message. Based on receiving the SM Policy Control Update, at 646, SMF-Rest-EP 602 transmits an SM Policy Control Update message to PCF 138 and, at 648, PCF 138 responds with a 200 OK message. At 650, SMF-SVC 604 transmits a Session Update Database message to subscriber data store 142 to update a location of UE 102 in a data store and, at 652, subscriber data store 142 responds with a 200 OK message. At 654, SMF-SVC 604 transmits a SM Context Modify response to SMF-Rest-EP and, at 656, SMF-Rest-EP 602 responds with a 200 OK message. At 658, SMF-Rest-EP 602 sends a SM Context Modify Response to AMF 122 and, at 660, AMF 122 responds with a 200 OK message.

If UE 102 is repeatedly transmitting cell re-selection messages over a period of time, updating the 5G core functions (e.g., subscriber data store 142, CHF 140, PFCP 144, UPF 134, etc.) with information associated with the cell re-selection messages may cause signal flooding.

Figure 7A:
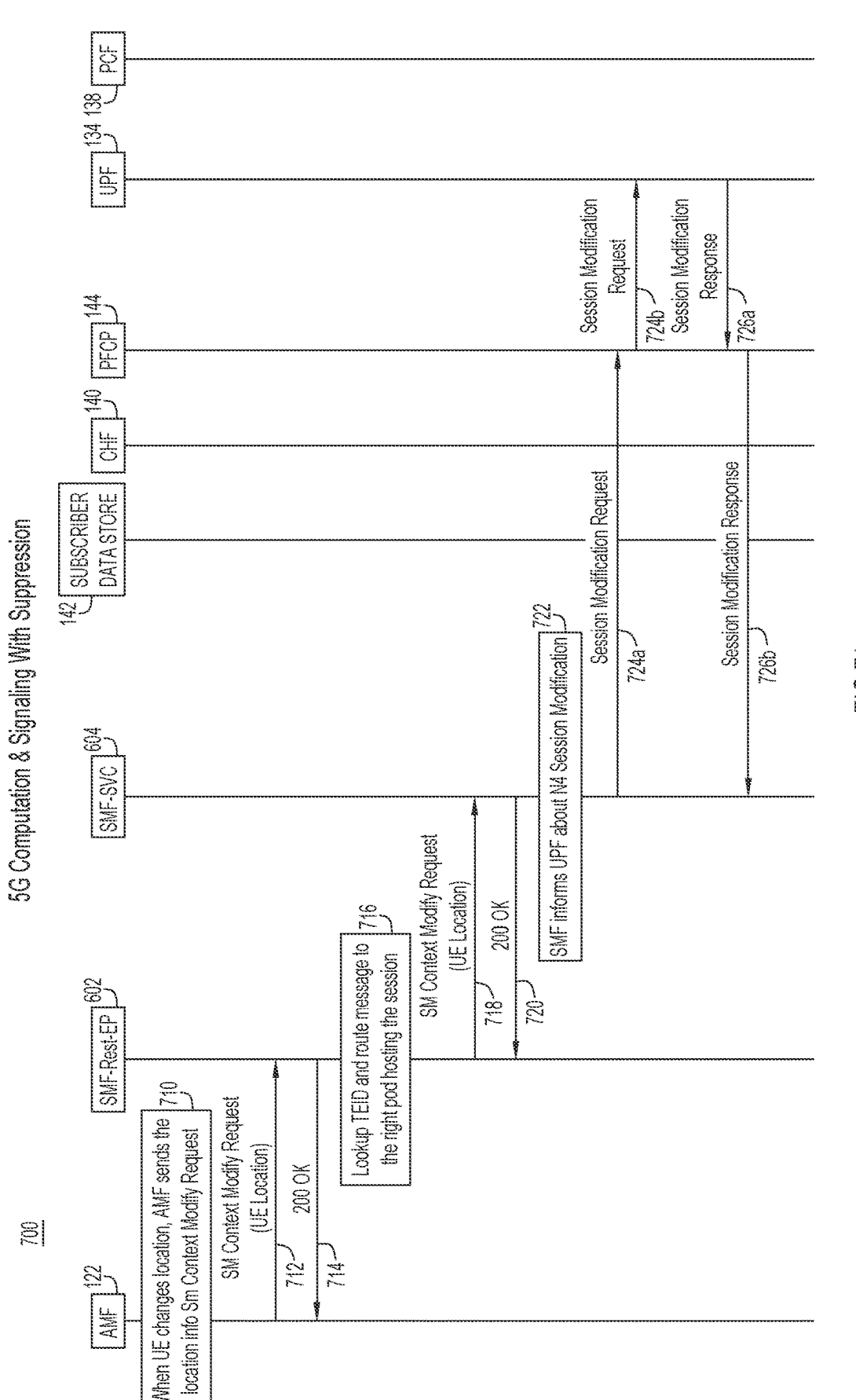

Reference is now made to FIGS. 7A and 7B. FIGS. 7A and 7B are a message sequence diagrams illustrating a method 700 of 5G computation and signaling based on receiving a cell re-selection message from UE 102 when UE 102 is in a suppression state. Method 700 is performed by AMF 122, SMF-Rest-EP 602, SMF-SVC 604, subscriber data store 142, CHF 140, PFCP 144, and UPF 134.

At 710, when the cell location of UE 102 changes, AMF 122 sends the new location information in a SM Content Modify Request. More specifically, at 712, AMF 122 transmits a SM Content Modify Request with the new location of UE 102 to SMF-Rest-EP 602 and, at 714, SMF-Rest-EP 602 responds with a 200 OK message. At 716, SMF-Rest-EP 602 performs a lookup using the TEID of the gNB corresponding to the cell location of UE 102 to determine the correct pod hosting the session associated with UE 102. At 718, SMF-Rest-EP 602 transmits the SM Context Modify Request with the UE location to SMF-SVC 604 (which was identified during the lookup) and, at 720, SMF-SVC 604 responds with a 200 OK message.

When UE 102 is in a suppression state, after receiving the SM Context Modify Request with the location of UE 102, at 722, SMF 136 informs UPF 134 about the N4 Session Modification. More specifically, at 724a, SMF-SVC 604 transmits a Session Modification Request to PFCP 144 and at 724b, PFCP 144 forwards the Session Modification Request to UPF 134. At 726a, UPF 134 transmits a Session Modification Response to PFCP 144 and, at 726b, PFCP 144 forwards the Session Modification Response to SMF-SVC 604. At 728, SMF-SVC 604 transmits a Session Update in Database message to subscriber data store 142 to update a data store with the new location of UE 102 and, at 730, subscriber data store 142 responds with a 200 OK message.

At 732, SMF-SVC 604 transmits an SM Context Modify response message to SMF-Rest-EP 602 and, at 734, SMF-Rest-EP 602 responds with a 200 OK message. At 736, SMF-Rest-EP 602 transmits a SM Context Modify response to AMF 122 and, at 738, AMF 122 responds with a 200 OK message.

When UE 102 is in a suppression state, fewer messages are sent to the 5G core, which prevents signal flooding caused by excessing signaling from cell re-selection messages repeatedly received from UE 102 over a period of time. When UE 102 exits the suppression state, subsequent signaling messages, such as cell re-selection messages, will be acted on using standard processing, as illustrated in FIGS. 6A and 6B.

Referring to FIG. 8, FIG. 8 is a flow chart depicting a method 800 according to an example embodiment. In particular, method 800 illustrates example operations that may be performed to place a UE in a suppression state based on receiving repeated signaling messages associated with one or more requests from the UE, as discussed for various techniques presented herein.

At 810, the method 800 may include identifying that a user device has transmitted a threshold number of signaling messages associated with one or more requests in a first time period. For example, it may be identified that UE 102 has transmitted a threshold number of cell re-selection requests associated with two or more cells in a threshold period of time. In another example, it may be determined that UE 102 has transmitted a threshold number of requests to attach to a network in a threshold period of time.

At 820, the method 800 may include placing the user device in a suppression state based on the identifying. For example, UE 102 may be placed in a suppression state in which updates associated with signaling messages associated with the one or more requests are not transmitted to some functions in the 4G/5G core.

At 830, the method 800 may include removing the user device from the suppression state when no signaling messages associated with the one or more requests are received during a second time period or when a signaling message associated with a different request is received from the user device. For example, if UE 102 has been placed in the suppression state based on receiving a threshold number of cell re-selection requests associated with two or more cells in a threshold period of time, UE 102 may be removed from the suppression state when no cell re-selection requests associated with the two or more cells have been received for a second time period or when a cell re-selection request associated with a different cell is received from UE 102. As another example, if UE 102 has been placed in the suppression state based on transmitting a threshold number of requests to attach to a network in a threshold period of time, UE 102 may be removed from the suppression state when no requests to attach to the network are received for a second time period or when a request to attach to a different network is received from the UE 102.

Figure 9:
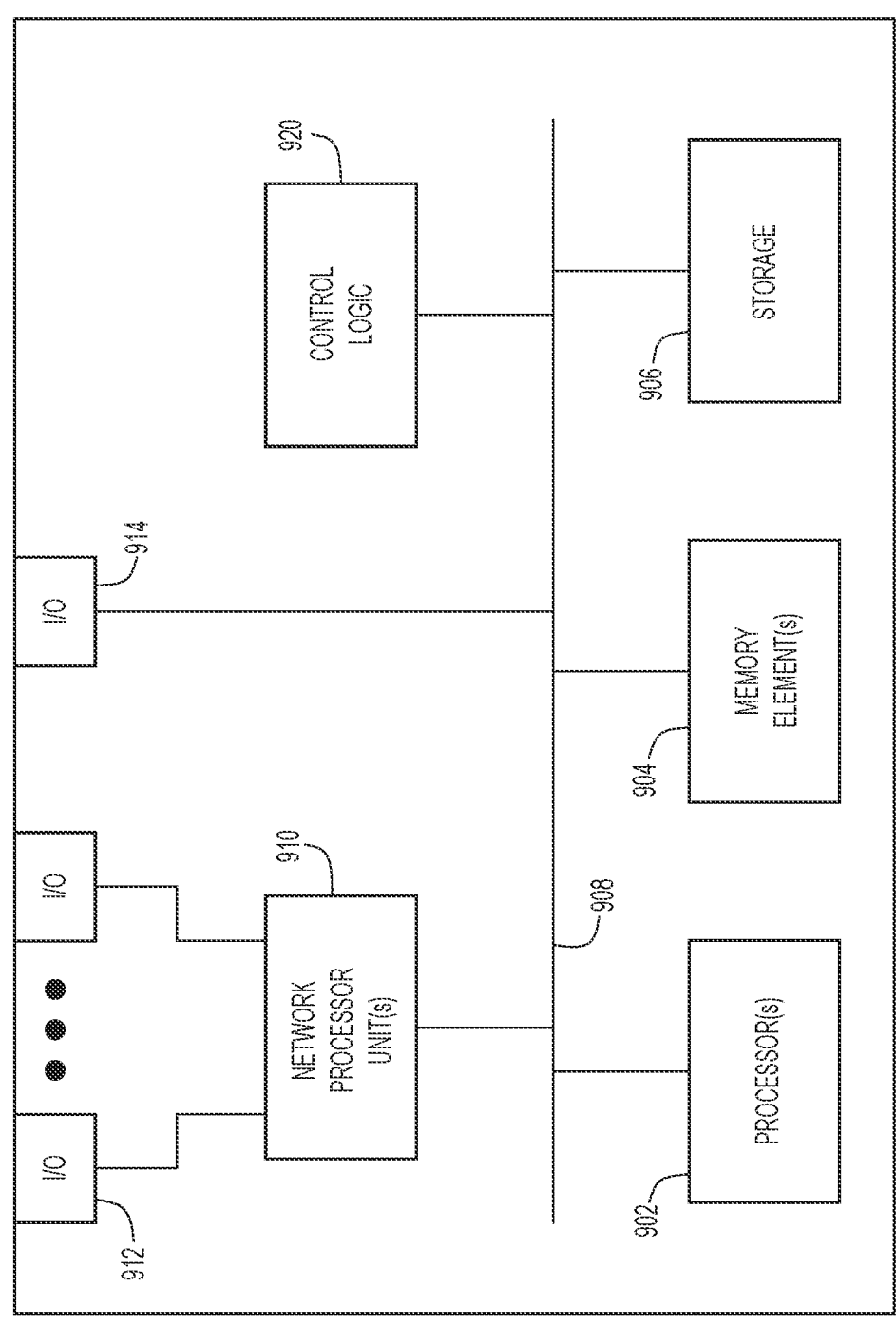
FIG. 9 is a hardware block diagram of a computing device that may perform functions associated with any combination of operations, in connection with the techniques discussed herein.

Referring to FIG. 9, FIG. 9 illustrates a hardware block diagram of a computing device 900 that may perform functions associated with delaying processing of an error indication as discussed herein in connection with the techniques described herein. In various embodiments, a computing device, such as computing device 900 or any combination of computing devices 900, may be configured as any of an MME, an AMF, an SGW, an SMF, a PGW-C, a PGW-U, a PCF, a UPF, a subscriber data store, a CHF, a PFCP, etc. as discussed for the techniques discussed herein.

It should be appreciated that FIG. 9 provides only an illustration of one embodiment and does not imply any limitations with regard to the environments in which different embodiments may be implemented. Many modifications to the depicted environment may be made.

In at least one embodiment, computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device. Processor(s) 902 (e.g., hardware processor(s)) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer-readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Figure 10:
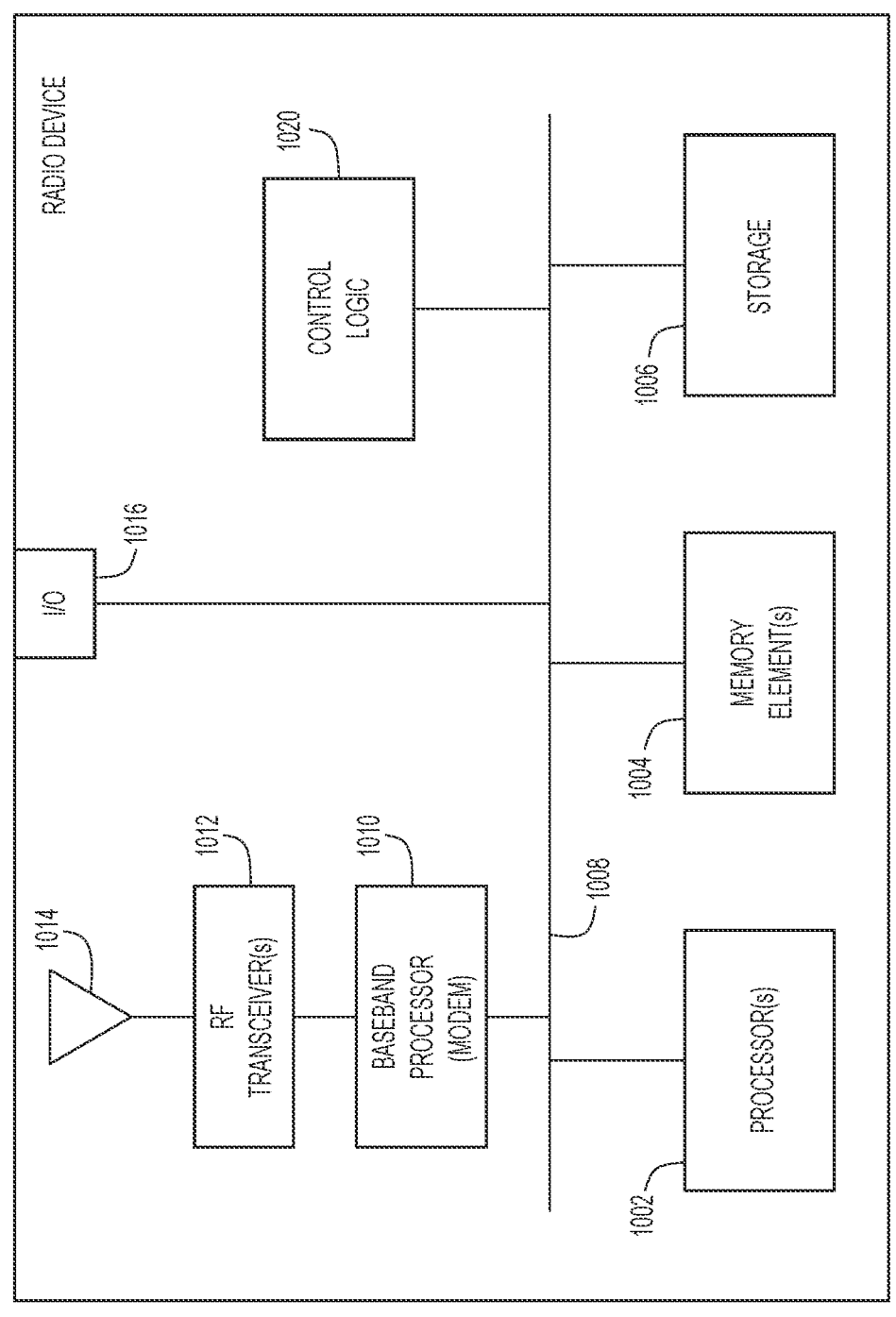
FIG. 10 is a hardware block diagram of a radio device that may perform functions associated with any combination of operations, in connection with the techniques discussed herein.

Referring to FIG. 10, FIG. 10 illustrates a hardware block diagram of a radio device 1000 that may perform functions associated with operations discussed herein. In various embodiments, a user equipment or apparatus, such as radio device 1000 or any combination of radio device 1000, may be configured as any radio node/nodes as depicted herein in order to perform operations of the various techniques discussed herein, such as operations that may be performed by any of a user device, such as UE 102, eNB 116, and gNB 126.

In at least one embodiment, radio device 1000 may be any apparatus that may include one or more processor(s) 1002, one or more memory element(s) 1004, storage 1006, a bus 1008, a baseband processor or modem 1010, one or more radio RF transceiver(s) 1012, one or more antennas or antenna arrays 1014, one or more I/O interface(s) 1016, and control logic 1020.

The one or more processor(s) 1002, one or more memory element(s) 1004, storage 1006, bus 1008, and I/O interface(s) 1016 may be configured/implemented in any manner described herein, such as described herein at least with reference to FIG. 9.

The RF transceiver(s) 1012 may perform RF transmission and RF reception of wireless signals via antenna(s)/antenna array(s) 1014, and the baseband processor (modem) 1010 performs baseband modulation and demodulation, etc. associated with such signals to enable wireless communications for radio device 1000.

In various embodiments, control logic 1020, can include instructions that, when executed, cause processor(s) 1002 to perform operations, which can include, but not be limited to, providing overall control operations of radio device 1000; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920/ 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904/1004 and/or storage 906/1006 can store data, software, code, instructions (e.g., processor instructions), logic, parameters, combinations thereof, and/or the like used for operations described herein. This includes memory element(s) 904/1004 and/or storage 906/1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided comprising identifying that a user device has transmitted a threshold number of signaling messages associated with one or more requests in a first time period; placing the user device in a suppression state based on the identifying; and removing the user device from the suppression state when no signaling messages associated with the one or more requests are received during a second time period or when a signaling message associated with a different request is received from the user device.

In one example, the signaling messages are requests for cell re-selection between two or more cells. In another example, the signaling messages are requests to attach to a network. In another example, when the user device is in the suppression state, subsequent messages received from the user device that are associated with the one or more requests are processed and updates associated with the subsequent messages are not forwarded to one or more core network functions. In another example, when the user device is in the suppression state, information associated with the one or more requests is maintained at an Access and Mobility Management Function (AMF) associated with the user device. In another example, the one or more core network functions include a Charging Function (CHF) and a Policy and Control Function (PCF). In another example, the threshold number of signaling messages, a length of the first time period, and a length of the second time period are configurable.

In another form, an apparatus is provided including: a memory for storing data; a network interface configured to enable network communications; and a processor for executing instructions associated with the data, wherein executing the instructions causes the apparatus to perform operations, including: identifying that a user device has transmitted a threshold number of signaling messages associated with one or more requests in a first time period; placing the user device in a suppression state based on the identifying; and removing the user device from the suppression state when no signaling messages associated with the one or more requests are received during a second time period or when a signaling message associated with a different request is received from the user device.

In another form, one or more non-transitory computer-readable storage media encoded with instructions are provided that, when executed by a processor, cause the processor to perform operations, including: identifying that a user device has transmitted a threshold number of signaling messages associated with one or more requests in a first time period; placing the user device in a suppression state based on the identifying; and removing the user device from the suppression state when no signaling messages associated with the one or more requests are received during a second time period or when a signaling message associated with a different request is received from the user device.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 902.11 (e.g., Wi-Fi®/Wi-Fi6®), IEEE 902.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

identifying that a user device has transmitted a threshold number of signaling messages associated with one or more requests in a first time period;

placing the user device in a suppression state based on the identifying, wherein, when the user device is in the suppression state, subsequent messages received from the user device that are associated with the one or more requests are processed, the one or more requests associated with the subsequent messages are acted upon, and updates associated with acting upon the one or more requests are not forwarded to one or more core network functions; and removing the user device from the suppression state when no signaling messages associated with the one or more requests are received during a second time period or when a signaling message associated with a different request is received from the user device.

2. The method of claim 1, wherein the signaling messages are requests for cell re-selection between two or more cells.

3. The method of claim 1, wherein the signaling messages are requests to attach to a network.

4. The method of claim 3, wherein, when the user device is in the suppression state, the user device attaches to the network in response to the requests to attach to the network.

5. The method of claim 1, wherein, when the user device is in the suppression state, information associated with the one or more requests is maintained at an Access and Mobility Management Function (AMF) associated with the user device.

6. The method of claim 1, wherein the one or more core network functions include a Charging Function (CHF) and a Policy and Control Function (PCF).

7. The method of claim 1, wherein the threshold number of signaling messages, a length of the first time period, and a length of the second time period are configurable.

8. An apparatus comprising:
a memory for storing data;
a network interface configured to enable network communications; and
a processor for executing instructions associated with the data, wherein executing the instructions causes the apparatus to perform operations, comprising:
identifying that a user device has transmitted a threshold number of signaling messages associated with one or more requests in a first time period;
placing the user device in a suppression state based on the identifying, wherein, when the user device is in the suppression state, subsequent messages received from the user device that are associated with the one or more requests are processed, the one or more requests associated with the subsequent messages are acted upon, and updates associated with acting upon the one or more requests are not forwarded to one or more core network functions; and
removing the user device from the suppression state when no signaling messages associated with the one or more requests are received during a second time period or when a signaling message associated with a different request is received from the user device.

9. The apparatus of claim 8, wherein the signaling messages are requests for cell re-selection between two or more cells.

10. The apparatus of claim 8, wherein the signaling messages are requests to attach to a network.

11. The apparatus of claim 10, wherein, when the user device is in the suppression state, the user device attaches to the network in response to the requests to attach to the network.

12. The apparatus of claim 8, wherein, when the user device is in the suppression state, information associated with the one or more requests is maintained at an Access and Mobility Management Function (AMF) associated with the user device.

13. The apparatus of claim 8, wherein the one or more core network functions include a Charging Function (CHF) and a Policy and Control Function (PCF).

14. The apparatus of claim 8, wherein the threshold number of signaling messages, a length of the first time period, and a length of the second time period are configurable.

15. One or more non-transitory computer-readable storage media encoded with instructions that, when executed by a processor, cause the processor to perform operations, comprising:
identifying that a user device has transmitted a threshold number of signaling messages associated with one or more requests in a first time period;
placing the user device in a suppression state based on the identifying, wherein, when the user device is in the suppression state, subsequent messages received from the user device that are associated with the one or more requests are processed, the one or more requests associated with the subsequent messages are acted upon, and updates associated with acting upon the one or more requests are not forwarded to one or more core network functions; and
removing the user device from the suppression state when no signaling messages associated with the one or more requests are received during a second time period or when a signaling message associated with a different request is received from the user device.

16. The one or more non-transitory computer-readable storage media of claim 15, wherein the signaling messages are requests for cell re-selection between two or more cells.

17. The one or more non-transitory computer-readable storage media of claim 15, wherein the signaling messages are requests to attach to a network.

18. The one or more non-transitory computer-readable storage media of claim 17, wherein, when the user device is in the suppression state, the user device attaches to the network in response to the requests to attach to the network.

19. The one or more non-transitory computer-readable storage media of claim 15, wherein, when the user device is in the suppression state, information associated with the one or more requests is maintained at an Access and Mobility Management Function (AMF) associated with the user device.

20. The one or more non-transitory computer-readable storage media of claim 15, wherein the threshold number, a length of the first time period, and a length of the second time period are configurable.

* * * * *